United States Patent [19]

Lee

[11] Patent Number: 4,943,796
[45] Date of Patent: Jul. 24, 1990

[54] REAR VIEW MIRROR MOUNTED REVERSING DISTANCE SENSOR

[76] Inventor: Y. C. Lee, 8F-1, No. 23, Sec. 1, Hang Chou S. Rd., Taipei, Taiwan

[21] Appl. No.: 363,724

[22] Filed: Jun. 9, 1989

[51] Int. Cl.$^5$ .............................................. B60Q 1/00
[52] U.S. Cl. .................................... 340/435; 340/436; 340/903; 362/83.1
[58] Field of Search ............... 340/435, 436, 901, 903; 362/83.1; 180/167, 169; 367/909

[56] References Cited

U.S. PATENT DOCUMENTS

| | | | |
|---|---|---|---|
| 4,684,164 | 8/1987 | Durham | 296/37.7 |
| 4,694,295 | 9/1987 | Miller et al. | 340/903 |
| 4,825,211 | 4/1989 | Park | 340/435 |

Primary Examiner—Donnie L. Crosland
Attorney, Agent, or Firm—Morton J. Rosenberg; David I. Klein

[57] ABSTRACT

The structure of a rear view mirror mounted reversing distance sensor for automobiles having a housing, a cover, a spring and a retaining bracket. The housing and the cover together form a hollow, L-shaped structure when assembled. The housing has an upright part and a base. A channel is formed on the central portion of one lateral surface, opposite and parallel to the cover, of the upright part. The channel receives the retaining bracket at the uppermost portion of the channel, which also receives a first pad. A second pad is disposed over the entire top surface of the base. The retaining bracket is a flat sheet of metal bent to form an L-shape. The first leg, parallel to the cover, of the retaining bracket is formed a tab with a first hole therethrough for securing of one end of the spring. The second leg, perpendicular to the cover, of the retaining bracket has a third pad disposed on it, the lower surface of which has a set of serrations for gripping a rear view mirror when the reversing distance sensor is mounted on the rear view mirror.

3 Claims, 3 Drawing Sheets

REAR VIEW MIRROR MOUNTED REVERSING DISTANCE SENSOR

BACKGROUND OF THE INVENTION

The present invention relates to a reversing distance sensor for automobiles and in particular to a rear view mirror mounted reversing distance sensor.

Heretofore, when a driver is reversing an automobile, he would determine the distance to any obstacles behind the automobile by visual recognition and then make an estimation of the distance between the obstacle and his own car. Needless to say, this method is inaccurate and frequently results in accidents and even injury to people. Often, obstacles behind the automobile are hidden from the driver's view by the rear of the automobile.

With the advance of technology, devices such as radar units and subsequently infrared detection devices have been developed. In fact, similar devices for the detections of distance to obstacles when reversing an automobile are already known in this field. The present invention however seeks to overcome the installation problems and inconvenience associated with locating and assembling the prior art.

In the prior art, the display unit of the distance sensor was located within the interior of the automobile and had to be mounted either on or under the dashboard. This requires the installation of mounting brackets which required drilling of holes and other mechanical skills thus making installation by the individual difficult and frequently requiring professional installation. Also, as automobile interiors vary greatly and with the limited space available in many small automobiles, the positioning of the display unit in a convenient and readily available location to the driver is quite difficult.

As nearly all automobiles are provided with an interior rearview mirror attached to the inside of the windshield or suspended from the roof near the top edge of the windshield, the attachment of the reversing distance sensor to the rearview mirror would be convenient.

The device is easily mounted by means of the spring-loaded clamping mechanism and due to its small size and light weight it is essentially hidden in the free space behind the rear view mirror. Also, the display panel, which is positioned along the lower edge of the rear view mirror, is easily and readily visible to the driver in a location that the driver is already accustomed to viewing during driving. Thus, it is convenient to use and thereby reducing the risk of accidents while reversing an automobile.

SUMMARY OF THE INVENTION

It is therefore a primary object of the present invention to mitigate and/or obviate the above-mentioned drawbacks and disadvantages by providing a reversing distance sensor that is easily and conveniently attachable to the interior rear view mirror of an automobile.

Another object of the present invention is to provide a reversing distance sensor that is mountable to the interior rear view mirror of an automobile wherein the display panel is visible along the lower edge of the rear view mirror.

These and other objects and advantages of the present invention will become apparent to those skilled in the art upon reading the detailed description provided hereinbelow, with appropriated reference to the accompanying drawings.

DETAILED DESCRIPTION OF THE PREFERRED EMBODIMENT

Figure 1:
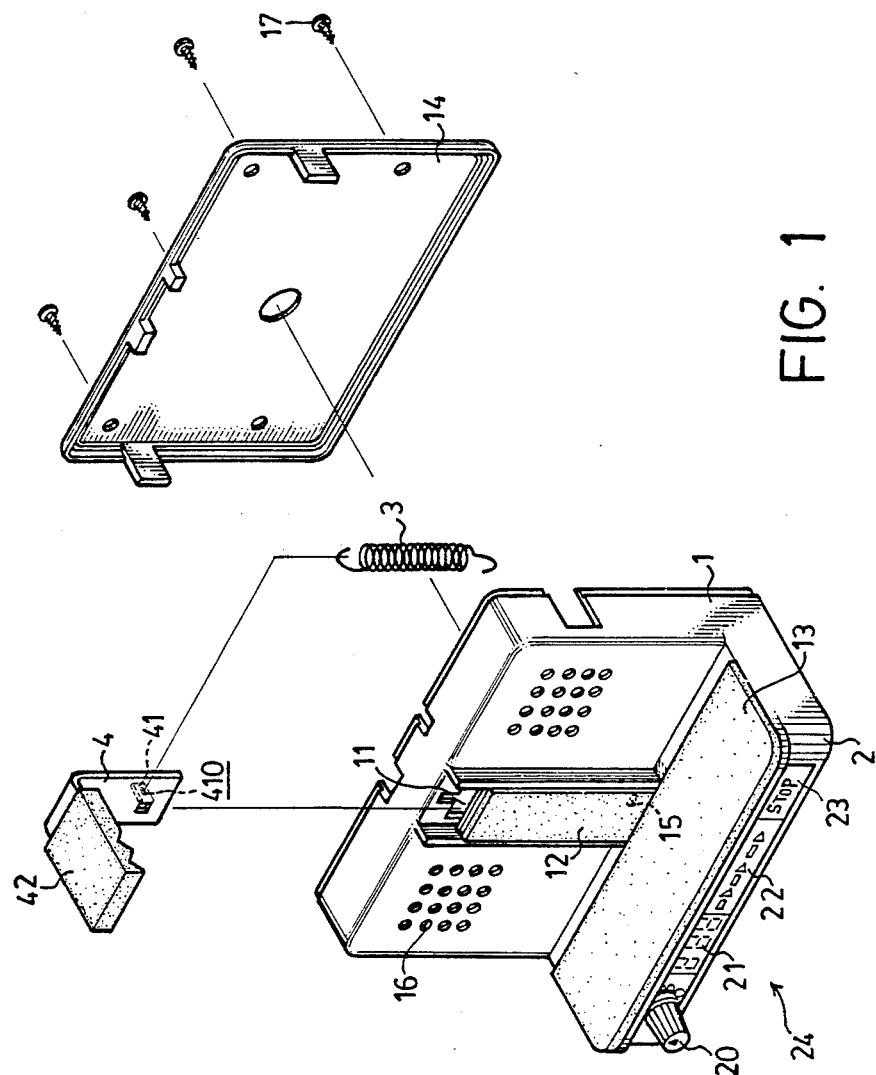
FIG. 1 is an exploded perspective view of a rear view mirror mounted reversing distance sensor for automobiles in accordance with the present invention.
Figure 2:
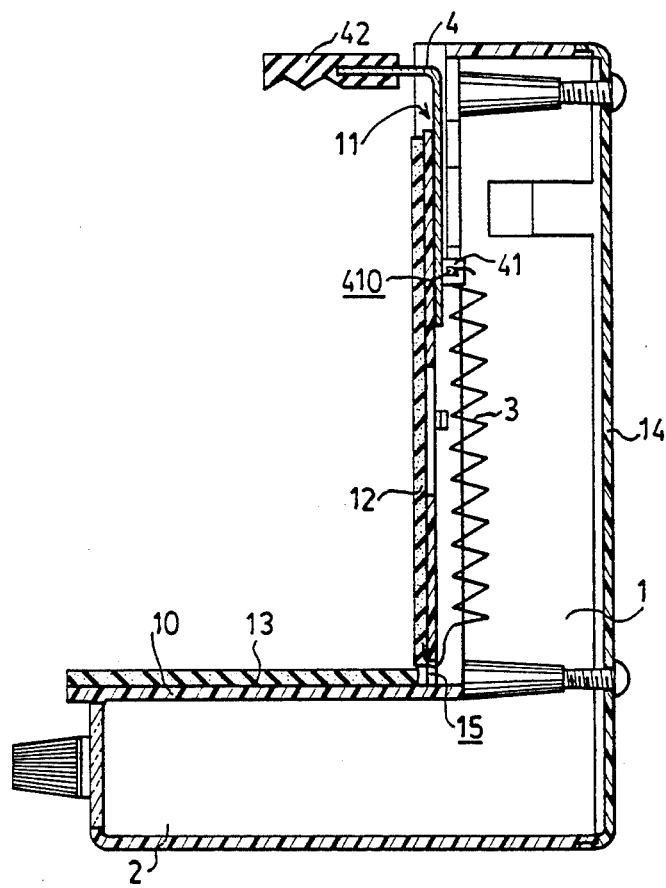
FIG. 2 is a cross-sectional view of the rear view mirror mounted reversing distance sensor of FIG. 1.

Referring to the drawings and in particular to FIGS. 1 and 2 thereof, a structure of a rear view mirror mounted reversing distance sensor in accordance with the present invention comprises a housing 10, a cover 14, a spring 3 and a retaining bracket 4.

The housing 10 and the cover 14 together form a hollow, substantially L-shaped structure when assembled by a plurality of screws 17, wherein the housing 10 is composed of an upright part 1 and a base 2. The housing 10 and the cover 14 are preferably injection molded parts of light weight thermoplastic material.

A channel 11 is formed on the central portion of the lateral surface, opposite and parallel to the cover 14, of the upright part 1. The channel 11 is essentially rectangular and of such size to receive the retaining bracket 4 at the uppermost portion thereof, which also receives a rectangular first pad 12 formed from rubber or similar type material at the lower portion thereof. Furthermore, a second pad 13 of similar material to that of the first pad 12 is disposed over the entire top surface of the base 2. Adjacent to the channel 11, a plurality of sound apertures 16 are provided on the lateral surface for the transmission of sound from a loudspeaker (not shown) lodged within the upright part 1.

The retaining bracket 4 is preferably a flat sheet of metal which is also L-shaped. The first leg of the retaining bracket 4, which is parallel to the cover 14, has a tab 41 stamped or formed thereon with a first hole 410 therethrough for securing of one end of the spring 3. The tab 41 extends outwardly and perpendicularly from the lateral surface, adjacent to the cover 14 of the first leg when the retaining bracket 4 is received in the channel 11. The second leg of the retaining bracket 4, which is perpendicular to the cover 14, has a third pad 42 of rubber or similar material adhered or integrally molded thereto. The lower surface of the third pad 42 is formed with a set of serrations for gripping the rear view mirror 5 when the reversing distance sensor is mounted on the rear view mirror, shown in FIG. 3.

From FIG. 2, it can be seen that the retaining bracket 4 is inserted through the channel 11. Further, one end of the spring 3 is attached to the tab 41 while the other end of the spring 3 is secured in a second hole 15 formed at the lowermost edge of the channel 11, with the latter distal end of the spring 3 between the first pad 12 and the lateral surface of the upright part 1.

Figure 3:
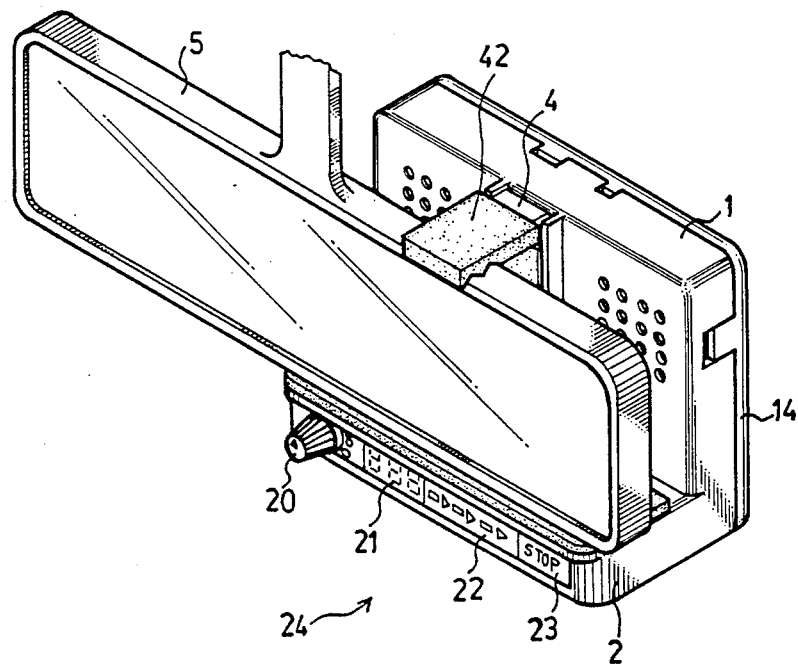
FIG. 3 is a perspective view of the rear view mirror mounted reversing distance sensor of FIG. 1 installed on a rear view mirror.

As can be seen in FIG. 3, it is readily seen that the first and second pads 12 and 13 form a cushion and bearing surface for the reversing distance sensor to contact the rear side and lower portion of the rear view mirror 5, respectively.

Along the lateral face of the base 2, which is parallel to the cover 14, is disposed a display panel 24 consisting of a volume control knob 20, a distance display LED (light emitting diode) 21, a graphic display 22 and warning "stop" light made of LEDs 23, as viewed from left to right in FIG. 1. The volume control knob 20 affords easy way to control the volume of the audible alarm which signals a warning when obstacles are present within close proximity to the rear of the automobile when reversing. The LED distance display 21 and graphics display 22 give two readily noticeable visual indications of an obstacle which may be present in the area behind an automobile when reversing.

As the technology and construction involved in ultrasonic transceiving for the reversing distance sensor is already known, further discussion and description are not considered necessary at this time. It is sufficient to say that obstacles located behind an automobile are struck by ultrasonic waves (approximately 40 KHz) emitted from transceivers positioned at the rear of the automobile and reflected back to the transceiver. This signal, indicating an obstacle, is then transmitted by conventional wiring methods to the reversing distance sensor wherein it is processed and an appropriate display is produced on the display panel 24.

As various possible embodiments might be made of the above invention without departing for the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A structure of a rear view mirror mounted reversing distance sensor for automobiles comprising a housing, a cover, a spring and a retaining bracket;

said housing and said cover together forming a hollow, substantially L-shaped structure when assembled by a plurality of screws; said housing being composed of an upright part and a base;

a channel being formed on a central portion of a lateral surface of said upright part, opposite and parallel to said cover; said channel receiving said retaining bracket at an uppermost portion thereof, and a first pad;

a second pad being disposed over an entire top surface of said base; and said retaining bracket being a flat sheet of metal bent to form an L-shape; a first leg of said retaining bracket being parallel to said cover and having a tab formed thereon with a first hole therethrough for securing of an end of a spring; a second hole provided on a lowermost portion of said channel to receive another end of said spring; said tab extending outwardly and perpendicularly from said lateral surface of said first leg when said retaining bracket is received in said channel; a second leg of said retaining bracket being perpendicular to said cover and having a third pad disposed thereon; a lower surface of said third pad being formed a set of serrations for gripping a rear view mirror when said reversing distance sensor is mounted on said rear view mirror.

2. A structure of a rear view mirror mounted reversing distance sensor as set forth in claim 1, wherein a display panel is provided along a lateral face of said base, said lateral face being parallel to said cover; and said panel consisting of a volume control knob, a distance display, a graphic display and warning stop light; said distance display and graphics display giving two readily noticeable visual indications of an obstacle which is present in an area behind an automobile when reversing.

3. A structure of a rear view mirror mounted reversing distance sensor as set forth in claim 1, wherein a plurality of sound apertures are provided on said lateral surface adjacent to said channel for a transmission of sound from a loudspeaker lodged within said upright part.

* * * * *